Nov. 3, 1964
W. J. HOLLENDEN ETAL  3,155,770
ENTRANCE SEAL FOR ELECTRICAL CONDUCTORS EXTENDING
THROUGH THE WALL OF A PRESSURE VESSEL
Filed April 24, 1963
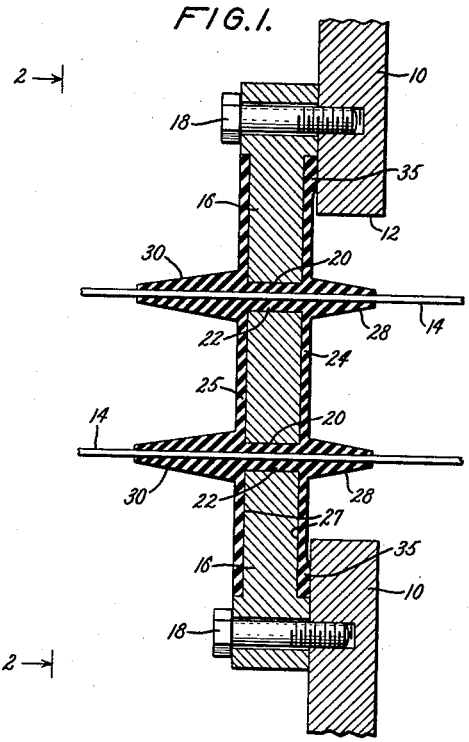
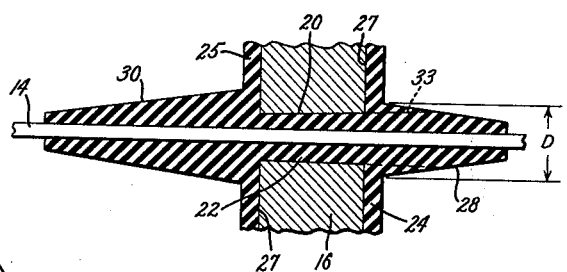
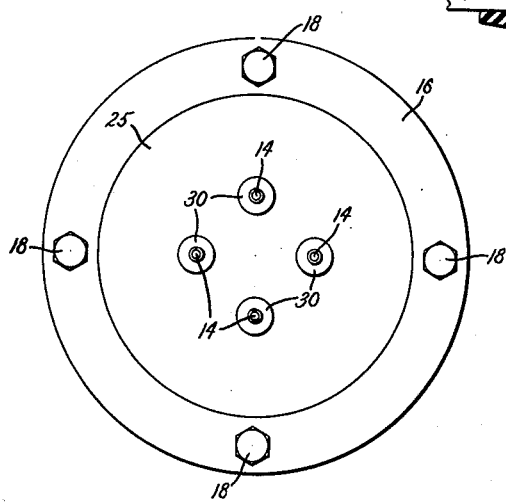
INVENTORS:
WILLIAM J. HOLLENDEN,
CHARLES E. WELSH,
BY William Freedman
ATTORNEY.

United States Patent Office 3,155,770
Patented Nov. 3, 1964

3,155,770
ENTRANCE SEAL FOR ELECTRICAL CONDUCTORS EXTENDING THROUGH THE WALL OF A PRESSURE VESSEL
William J. Hollenden, Bellmawr, N.J., and Charles E. Welsh, Landsdowne, Pa., assignors to General Electric Company, a corporation of New York
Filed Apr. 24, 1963, Ser. No. 275,314
5 Claims. (Cl. 174—153)

This invention relates to an entrance seal for electrical conductors that extend through the wall of a pressure vessel and are at widely different voltages with respect to each other and the wall.

Numerous different types of entrance seals have been proposed for insulating such conductors and for preventing leakage of pressurized fluid along the conductors. But prior entrance seals of which we are aware have been subject to a number of different problems which have seriously reduced their reliability. For example, some of these prior seals have been unduly susceptible to damage from vibrations and rough handling, and some have lost their sealing abilities when subjected to wide temperature variations.

Accordingly, an object of our invention is to provide an entrance seal for electrical conductors that is capable of maintaining its sealing abilities despite severe vibrations, rough handling, and thermal cycling.

Another object is to provide an entrance seal of the above character which is economical to manufacture and which has exceptional electrical insulating properties that permit conductors at widely different voltages to be located very close together without the risk of an electrical breakdown.

In carrying out our invention in one form, we provide an entrance seal for electrical conductors that comprises a metal plate having one side in a high pressure region and the other side in a low pressure region. The metal plate has spaced apart openings extending therethrough and the conductors respectively extend through these openings in laterally-spaced relationship to each other. A tube of resilient plastic insulating material surrounds each of the conductors and is located within the opening through which the conductor extends. This tube is bonded in gas-tight relationship along its inner periphery to the conductor and along its outer periphery to the inner periphery of the opening. A first sheet of resilient plastic insulating material contiguous with the high pressure side of said plate and integral with the tubes is bonded to the high pressure side of the plate along substantially all contiguous surfaces of the plate and the first sheet. A second sheet of resilient plastic insulating material contiguous with the low pressure side of the plate and integral with the tubes is bonded to the low pressure side of the plate along substantially all contiguous surfaces of said plate and said second sheet. Each of the tubes of insulating material comprises a pair of integrally formed tubular extensions surrounding its associated conductor and projecting along the length of said conductor from the sheets at opposite sides of said plate through distances that are large compared to the thickness of the sheets. The tubular extension located on the high pressure side of the plate has a cross-sectional area measured in the plane where the extension intersects the outer surface of said first sheet that is substantially larger than the cross sectional area of said opening on the high pressure side of said plate.

For a better understanding of our invention, reference may be had to the following description taken in conjunction with the accompanying drawing, wherein:

FIG. 1 is a cross sectional view through an entrance seal embodying one form of our invention.

FIG. 2 is an end view on a reduced scale taken along the line 2—2 of FIG. 1.

FIG. 3 is an enlarged view of a portion of FIG. 1.

Referring now to FIG. 1, there is shown a pressurized vessel having a metallic wall 10 containing an opening 12. The space to the right of the wall 10 is at a relatively high pressure and the space to the left of the wall 10 is at a relatively low pressure.

Within the pressurized vessel there is electrical equipment (not shown) which it is desired to electrically interconnect with other equipment in the low pressure region to the left of the wall 10. A plurality of spaced apart conductors 14 are provided for effecting this electrical interconnection.

These conductors 14 extend through the opening 12 in the wall 10 and are supported within this opening 12 by a circular metal plate 16, which seals the opening 12. This metal plate 16 is bolted at its outer periphery to the wall 10 by a series of circumferentially spaced bolts 18, two of which are shown in FIG. 1, each threaded in a suitable hole provided in the wall 10. The plate 16 contains a series of spaced-apart circular openings 20 extending therethrough and through each of which one of the conductors 14 extends. Four such openings 20 are provided in the illustrated plate 16, but more or less could equally well be provided.

The space between each conductor 14 and its surrounding opening 20 is filled with a tubular mass 22 of resinous insulating material. This tubular mass 22 of insulating material is bonded in gas-tight relationship about its outer periphery to the inner periphery of the opening 20 and is bonded in gas-tight relationship about its inner periphery to the exterior of the bare conductor 14. All of the tubular masses 22 in the laterally spaced-apart openings 20 are integrally joined to said sheets 24 and 25 of insulating material, which are contiguous with opposite sides of the metal plate 16. These sheets 24 and 25 are of the same resinous material as the tubular masses 22 and are bonded to the metal plate 16 in gas-tight relationship along all contiguous surfaces of the plate and the sheets. Preferably these sheets are of a circular form and are located in circular recesses 27 provided on opposite faces of the plate 16.

Each tubular mass 22 comprises a pair of integrally formed tubular extensions 28 and 30 at its opposite ends. These tubular extensions 28 and 30 surround the associated conductor 14 and project along the length of the conductor from the sheets 24 or 25 at opposite sides of the plate 16. These extensions 28 and 30 are integral with the sheets 24 and 25, respectively, and are relatively long compared to the thickness of these sheets.

The purpose of the tubular extensions 28 and 30 is to provide a long electrical creepage distance between the conductors 14, which may be at widely different voltages from each other and from the metal plate 16. The shortest creepage path between the conductors 14 extends along the external length of these extensions 28 and 30, and, thus, even though the conductors 14 might be quite close together there is still a relatively long creepage path present to electrically isolate the adjacent conductors and suppress electrical breakdowns therebetween. It is to be further noted that the shortest creepage path between adjacent conductors 14 extends along the outer surface of the sheets 24 and 25. Hence, the sheets 24 and 25 serve to provide additional creepage distances to suppress electrical breakdowns.

The entire insulating structure shown in FIGS. 1 and 2 is formed by molding it in situ about the plate 16 and the conductors 14 as a solid, integrally-formed mass. However, prior to the molding operation, a suitable primer is applied to all those metal surfaces to which it is desired to bond the insulating structure. The particular primer that is used will depend upon the character of the insulating material. With the urethane insulating material disclosed hereinbelow, I prefer to use a primer sold by the Stanley Chemical Co. under the trade name Stanley 40 x 415 or one sold by the Dayton Chemical Co. under the trade name Thixon XAB-199. The molding operation is then performed by first placing the plate 16 in a suitable mold having an internal configuration conforming to the illustrated external configuration of the insulating structure. Thereafter, the conductors 14 are suitably supported in the openings 20, and a liquid resin is poured into the mold. The resin is then suitably cured to solidify it and thus form the illustrated insulation.

Although there are a number of different resins that can be used in this application, I prefer to use a urethane polymer sold by E. I. du Pont Co. under the trade name of Adiprene L-100. When cured, this resin is a resilient solid that maintains its resilience at all temperatures between −40° F. and 200° F. and has a thermal coefficient of expansion compatible with most metals. A preferred curing agent for the resin is 4,4'-methylene-bis-(2-chloroaniline). When this resin solidifies upon curing, an extremely strong gas-tight bond is formed between the insulating material and the adjacent metal along substantially all contiguous surfaces. Thus, the sheets 24 and 25 are bonded in gas-tight relationship to the plate 16 along substantially the entire interface between the sheets and the plate 16, and the tubular masses 22 are bonded in gas-tight relationship to plate 16 along their outer periphery and to the conductors 14 along their inner periphery.

These bonds provide a highly effective seal that prevents any pressurized gas from the right hand side of the wall 10 from leaking past the plate 16 along the conductors 14 or about the outer periphery of the tubular masses 22. The effectiveness of this seal is further increased by the fact that pressurized gas on the right hand side of the plate 16 forces the sheet 24 into high pressure engagement with the plate, thus making it even more difficult for gas to find a leakage path along the interface of the plate 16 and the sheet 24.

To reinforce the bond between each tubular mass 22 and its adjacent parts, we shape the hole 20 so that it has a slight taper, with its larger diameter being located on the high pressure side of plate 16. Thus, when pressurized gas acts on the tubular mass 22 and urges it to the left in FIG. 1, a wedging action occurs which forces the tubular mass into firmer engagement with the inner periphery of opening 20 and also into firmer engagement with the outer periphery of conductor 14. This firmer engagement makes it more difficult for pressurized gas to find a leakage path along either periphery of the tubular mass 22.

The fact that the resin is elastic or resilient over a wide temperature range and has a thermal coefficient of expansion compatible with the metal of plate 16 and conductors 14 assures that the bond between the resin and the metal parts will not be impaired by temperature variations, even if they occur over a wide range.

To impart increased mechanical strength to the seal, we shape the extensions 28 in such a manner that each has a diameter D at its base that is substantially larger than the diameter of the hole 20 at the adjacent side of the plate 16. Referring to FIG. 3, this diameter D is measured in the plane where the extension 28 intersects the outer surface of the sheet 24. By making this diameter relatively large in comparison to that of the hole 20, we can reduce the shearing stresses that are imposed by fluid pressure forces acting toward the left on the bond at the inner periphery of the hole 20. More specifically, these forces are now borne not only by the circular bond at the inner periphery of the hole 20 but also by the portion of the extension 28 that is aligned with the circular bond. This extra area is indicated by the dotted lines 33 of FIG. 3. Those forces tending to eject the tubular mass 22 from the pressure vessel are thus distributed over a substantially larger area than that of the bond, thus reducing the shearing stresses imposed on the bond.

Since an appreciable portion of the extension 28 is available to bear these shearing forces, the sheet 24 is not needed in order to bear these forces and can therefore be quite thin. This is highly desirable not only because it permits a saving in insulating material, but also because the thinner is the sheet 24, the longer is the electrical creepage distance available over the outside surface of the extension 28 for a given projection of the extension 28 from the plate 16. Preferably, the outer extensions 30 also have a base larger than the hole 20 in order to impart increased mechanical strength.

As an indication of the exceptional mechanical strength of our seal, reference is had to pull tests conducted on the seal. In these tests, we applied tensile forces on the individual conductors 14 from the left hand side of plate 16. The metal conductors invariably failed at some point to the left of the seal before the seal showed any signs of damage. A typical force at which this occurred was 230 pounds. The seals tested had copper conductors with a diameter of .081 inch. The average diameter of the hole 20 was 3/16 inch; the dimension D was 1/4 inch; the thickness of sheets 24 and 25 was 1/16 inch; and the thickness of plate 16 at the holes 20 was 3/8 inch. The extension 30 had a length of 11/16 inch and the extension 28 had a length of 7/16 inch. The seal also was found to be gas-tight, even when gas pressure of several hundred p.s.i. was applied to the right hand side of the plate 16.

The exceptional mechanical strength referred to hereinabove permits our entrance seals to be subjected to considerable rough handling with no appreciable risk of damage. One reason that this is advantageous is that, in assembling apparatus embodying this seal, a wireman may bend, pull, and push the conductors 14 to virtually the limit of the conductor's strength without damaging the seal. The extensions 30 or 28, being resilient, can be stricken with sharp blows without being damaged. The resilience of the insulating material permits the structure to be subjected to severe vibrations without impairing any of the above described bonds.

As an indication of the exceptional electric insulating abilities of our seal, reference is had to tests conducted on typical seals having the dimensions set forth hereinabove, with the conductor center lines a minimum of 1/2 inch apart. These seals were found capable of consistently withstanding 14 kv. of 60 cycle voltage, applied successively to each of the conductors with the remaining conductors and the plate then at ground potential.

In a preferred form of our seal, the inner plastic sheet 24 is provided with an integrally-formed thickened portion 35 about its entire outer periphery. This thickened peripheral portion 35 serves as a gasket for providing a seal between the plate 16 and the wall 10 around the periphery of the large opening 12. The pressure from bolts 18 compresses this thickened portion 35 and urges it into effective sealing relationship with the adjacent surface of wall 10.

Although the conductors 14 are shown as being bare on opposite sides of the seal, it is to be understood that they can be covered with suitable insulation. This insulation, however, is of such a nature that it does not prevent the pressurized gas within the pressure vessel from acting directly on the metallic conductors 14 and tending to force them to the left.

While we have shown and described a particular embodiment of our invention, it will be obvious to those skilled in the art that various changes and modifications may be made without departing from our invention in its broader aspects. We, therefore, intend in the appended claims to cover all such changes and modifications as fall within the true spirit and scope of our invention.

What we claim as new and desire to secure by Letters Patent of the United States is:

1. An entrance seal for elongated electrical conductors extending between a high pressure region and a low pressure region, comprising:
   (a) a metal plate having one side in said high pressure region and the other side in said low pressure region and having spaced-apart openings extending therethrough,
   (b) said conductors being laterally spaced apart and respectively extending through said openings,
   (c) a tube of resilient plastic insulating material surrounding each of said conductors and located within the opening through which the conductor extends, each said tube being bonded in gas-tight relationship along its inner periphery to said conductor and along its outer periphery to the inner periphery of said opening,
   (d) a first sheet of resilient plastic insulating material contiguous with the high pressure side of said plate and integral with said tubes, said first sheet being bonded to said high pressure side of the plate along substantially all contiguous surfaces of said plate and said first sheet,
   (e) a second sheet of resilient plastic insulating material contiguous with the low pressure side of said plate and integral with said tubes, said second sheet being bonded to said low pressure side of the plate along substantially all contiguous surfaces of said plate and said second sheet,
   (f) each of said tubes of insulating material comprising a pair of integrally-formed tubular extensions surrounding its associated conductor and projecting along the length of said conductor from the sheets at opposite sides of said plate through distances that are large compared to the thickness of said sheets,
   (g) the tubular extension located on the high pressure side of said plate having a cross sectional area measured in the plane where the extension intersects the outer surface of said first sheet that is substantially larger than the cross sectional area of said opening at the high pressure side of said plate.

2. An entrance seal for elongated electrical conductors extending between a high pressure region and a low pressure region, comprising:
   (a) a metal plate having one side in said high pressure region and the other side in said low pressure region and having spaced-apart openings extending therethrough,
   (b) said conductors being laterally spaced apart and respectively extending through said openings,
   (c) a tube of resilient plastic insulating material surrounding each of said conductors and located within the opening through which the conductor extends, each said tube being bonded in gas-tight relationship along its inner periphery to said conductor and along its outer periphery to the inner periphery of said opening,
   (d) sheets of resilient plastic insulating material respectively contiguous with the high pressure side and the low pressure side of said plate and integral with said tubes, said sheets being bonded respectively to said high pressure side and said low pressure side of the plate along substantially all contiguous surfaces of said plate and said sheet,
   (e) each of said tubes of insulating material comprising a pair of integrally formed tubular extensions surounding its associated conductor and projecting along the length of said conductor from opposite sides of said plate through distances that are large compared to the thicknes of said sheets,
   (f) the tubular extension located on the high pressure side of said plate having a cross sectional area measured in the plane where said extension intersects the outer surface of said sheet on said high pressure side that is substantially larger than the cross sectional area of said opening at said high pressure side of the plate.

3. The entrance seal of claim 2 in which said openings are tapered from the high pressure side to the low pressure side of said plate so that pressure from the high pressure side acting on said tubes wedges said tubes into firmer engagement with the inner periphery of said openings and into firmer engagement with the outer periphery of said conductors.

4. An entrance seal for elongated eletcrical conductors extending between a high pressure region and a low pressure region, comprising:
   (a) a metal plate having one side in said high pressure region and the other side in said low pressure region and having spaced-apart openings extending therethrough,
   (b) said conductors being laterally spaced apart and respectively extending through said openings,
   (c) a tube of resilient plastic insulating material surrounding each of said conductors and located within the opening through which the conductor extends, each said tube being bonded in gas-tight relationship along its inner periphery to said conductor and along its outer periphery to the inner periphery of said opening.
   (d) a sheet of resilient plastic insulating material contiguous with the high pressure side of said plate and integral with said tubes, said sheet being bonded to said high pressure side of the plate along substantially all coniguous surfaces of said plate and said sheet,
   (e) each of said tubes of insulating material comprising a pair of integrally formed tubular extensions surrounding its associated conductor and projecting along the length of said conductor from opposite sides of said plate through distances that are large compared to the thickness of said sheet,
   (f) the tubular extension located on the high pressure side of said plate having a cross sectional area measured in the plane where said extension intersects the outer surface of said sheet that is substantially larger than the cross sectional area of said opening at said high pressure side of the plate,
   (g) a wall having an opening therein, said plate being arranged to cover said opening, said plastic sheet at the high pressure side of said plate having a thickened peripheral portion about its entire outer periphery that fits between said plate and said wall,
   (h) and means clamping said plate against said wall with said thickened peripheral portion sandwiched between said palte and said wall and forming a seal therebetween.

5. An entrance seal for elongated electrical conductors extending between a high pressure region and a low pressure region, comprising:
   (a) a metal plate having one side in said high pressure region and the other side in said low pressure region and having spaced-apart openings extending therethrough,
   (b) said conductors being laterally spaced apart and and respectively extending through and openings,
   (c) a tube of resilient plastic insulating material surrounding each of said conductors and located within the opening through which the conductor extends, each said tube being bonded in gas-tight relationship along its inner periphery to said conductor and along its outer periphery to the inner periphery of said opening,
   (d) a sheet of resilient plastic insulating material contiguous with the high pressure side of said plate and integral with said tubes, said sheet being bonded to said high pressure side of the plate along substantially all contiguous surfaces of said plate and said sheet,
   (e) each of said tubes of insulating material comprising a pair of integrally formed tubular extensions surrounding its associated conductor and projecting along the length of said conductor from opposite sides of said plate through distances that are large compared to the thickness of said sheet,
(f) a wall having an opening therein covered by said plate,
(g) said plastic sheet at the high pressure side of said plate having a thickened peripheral portion about its entire outer periphery that fits between said plate and said wall.
(h) and means clamping said plate aganist said wall with said thickened peripheal portion sandwiched between said plate and said wall and forming a seal therebetween.

References Cited by the Examiner
UNITED STATES PATENTS

| | | | |
|---|---|---|---|
| 1,027,404 | 5/12 | Deibel | 174—18 |
| 1,040,050 | 10/12 | Steinberger | 174—153 X |
| 2,451,516 | 10/48 | Skobel | 174—151 |
| 2,694,165 | 11/54 | Trombetta | 174—18 X |

FOREIGN PATENTS 629,999    10/49    Great Britain.

JOHN F. BURNS, *Primary Examiner.*

JOHN P. WILDMAN, *Examiner.*